(12) United States Patent
Hoffjann et al.

(10) Patent No.: US 10,293,945 B2
(45) Date of Patent: May 21, 2019

(54) AIRCRAFT HAVING A REDUNDANT AND EFFICIENT BLEED SYSTEM

(71) Applicant: Airbus Operations GmbH, Hamburg (DE)

(72) Inventors: Claus Hoffjann, Hamburg (DE); Wolfgang Engel, Hamburg (DE); Jörg Tappermann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/717,676

(22) Filed: Sep. 27, 2017

(65) Prior Publication Data
US 2018/0037327 A1 Feb. 8, 2018

Related U.S. Application Data

(63) Continuation of application No. PCT/EP2016/056915, filed on Mar. 30, 2016.

(30) Foreign Application Priority Data

Mar. 30, 2015 (EP) .................................... 15161787

(51) Int. Cl.
*B64D 13/06* (2006.01)
*F25B 27/00* (2006.01)
(Continued)

(52) U.S. Cl.
CPC ............ *B64D 13/06* (2013.01); *B64D 41/00* (2013.01); *F25B 27/00* (2013.01); *B64D 15/04* (2013.01);
(Continued)

(58) Field of Classification Search
CPC ............ B64D 2013/0618; B64D 13/06; B64D 41/00; B64D 15/04; B64D 2013/0644; B64D 2013/0611; F25B 27/00
See application file for complete search history.

(56) References Cited

U.S. PATENT DOCUMENTS 5,442,905 A * 8/1995 Claeys .................. B64D 13/06
454/71
5,911,388 A 6/1999 Severson et al.
(Continued)

FOREIGN PATENT DOCUMENTS

| CN | 102224074 A | 10/2011 |
|---|---|---|
| DE | 19821952 A1 | 11/1999 |

(Continued)

OTHER PUBLICATIONS

European Search Report (dated May 25, 2016) (EP 15201217.5).
(Continued)

*Primary Examiner* — Cassey D Bauer
(74) *Attorney, Agent, or Firm* — Lorenz & Kopf LLP

(57) ABSTRACT

An aircraft having at least one thrust providing jet engine and a fuselage with an integrated pressurized cabin includes an environmental control system having at least one pneumatic air cycle air conditioning unit, a bleed air port in the at least one thrust providing jet engine, a non thrust providing auxiliary supply unit configured to provide electricity and compressed air on ground and during flight, and at least one compressed air line. The at least one compressed air line is coupled with the bleed air port and the auxiliary supply unit. The environmental control system is coupled with the at least one compressed air line. Further, the auxiliary supply unit is dimensioned to exclusively operate the environmental control system by delivering compressed air, and bleed air
(Continued)

from the bleed air port is selectively providable to the environmental control system for redundancy.

8 Claims, 2 Drawing Sheets

(51) Int. Cl.
*B64D 41/00* (2006.01)
*B64D 15/04* (2006.01)

(52) U.S. Cl.
CPC ............. *B64D 2013/0611* (2013.01); *B64D 2013/0618* (2013.01); *B64D 2013/0644* (2013.01); *B64D 2041/005* (2013.01); *Y02T 50/56* (2013.01); *Y02T 90/36* (2013.01)

(56) References Cited

U.S. PATENT DOCUMENTS

| | | |
|---|---|---|
| 6,296,957 B1 | 10/2001 | Graage |
| 2003/0075643 A1 | 4/2003 | Dunn |
| 2004/0043276 A1* | 3/2004 | Hoffjann ............... B01D 53/02 |
| | | 429/411 |
| 2006/0099477 A1 | 5/2006 | Hoffjann |
| 2006/0199064 A1 | 9/2006 | Arnold |
| 2006/0237583 A1 | 10/2006 | Fucke et al. |
| 2010/0316928 A1 | 12/2010 | Westenberger et al. |
| 2012/0301290 A1* | 11/2012 | Justak ............... B64D 41/007 |
| | | 415/208.2 |
| 2014/0325991 A1 | 11/2014 | Liew et al. |
| 2015/0014479 A1* | 1/2015 | Bayliss ............... H02J 4/00 |
| | | 244/58 |

FOREIGN PATENT DOCUMENTS

| | | |
|---|---|---|
| DE | 102004058430 A1 | 6/2006 |
| DE | 102006009844 A1 | 9/2007 |
| DE | 102012007384 A1 | 10/2013 |
| DE | 102014119279 A1 | 6/2016 |
| EP | 0957026 A2 | 11/1999 |
| EP | 1928745 B1 | 6/2008 |
| EP | 2222562 B1 | 8/2012 |
| WO | 2004037641 A2 | 5/2004 |
| WO | 2011147977 A2 | 12/2011 |
| WO | 2013087051 A1 | 6/2013 |

OTHER PUBLICATIONS

German Search Report (dated Sep. 29, 2015) (DE 10 2014 119 279.6).
USPTO Non-Final Office Action for U.S. Appl. No. 14/975,347, dated Aug. 8, 2017 (AIRBUS 3.0E-595).
International Search Report and Written Opinion (PCT/EP2016/056915) (dated Jun. 27, 2016).
Chinese Office Action received Jun. 23, 2017 (CN20151096395.6).

* cited by examiner

AIRCRAFT HAVING A REDUNDANT AND EFFICIENT BLEED SYSTEM

CROSS-REFERENCE TO PRIORITY APPLICATIONS

This application is a continuation of international patent application number PCT/EP2016/056915, having an international filing date of Mar. 30, 2016, which claims priority to European patent application number 15161787.5, having a filing date of Mar. 30, 2015. Both of these referenced applications are incorporated by reference herein.

TECHNICAL FIELD

Embodiments of the subject matter described herein relate generally to an aircraft having a bleed system and, particularly, to an aircraft with a bleed air operated environmental control system.

BACKGROUND

Commercial aircraft commonly comprise a pressurized cabin arranged in a fuselage and supplied with conditioned air through an environmental control system. Often, the environmental control system comprises at least one air cycle machine as a refrigeration unit, which is often referred to as an air conditioning pack and is supplied with pressurized air tapped from main engines of the aircraft. The pressurized air is routed through a series of turbines, heat exchangers and compressors and allows to create relatively high flow rates of conditioned air with a certain temperature and pressure. Hence, cooling and pressurization of the cabin are accomplished through the air-conditioning pack at the same time.

However, tapping air from a compressor section of a jet engine leads to decreasing the efficiency of the respective engine, as fuel is consumed for compressing air for supporting the combustion and thrust, while a part of the air is taken away from this process by the environmental control system. Other techniques are known, which are based on supporting an air-cycle process and comprise additional cooling means or additional compressors.

For example, international patent document WO 2011/147977 A2 shows a system for air conditioning an aircraft cabin, comprising at least one cooling circuit, at least one compressed-air line and at least one compressor for compressing air, wherein the cooling circuit is connected to the compressor by way of the compressed-air line, and wherein the compressor is drivable independently of bleed air.

Still further, electrical environmental control systems are known, which are operable without bleed air and receive a flow of fresh air from ram air inlets.

BRIEF SUMMARY

By modifying the working principle of an established and proven environmental control system for the purpose of increasing the efficiency of the aircraft, relatively high costs are to be expected. These derive from a required redesign of relatively large systems in the aircraft, achieving a certification and other costs.

It may therefore be considered an object of the disclosed subject matter to provide an aircraft having an improved overall efficiency, while it is possible to reduce modifications and working principles of reliable and common systems.

This object is met by an aircraft having the features of independent claim 1. Advantageous embodiments and further improvements may be gathered from the sub-claims and the following description.

An aircraft is proposed, the aircraft having at least one thrust providing jet engine and a fuselage with an integrated pressurized cabin, the aircraft comprising an environmental control system comprising at least one pneumatic air cycle air conditioning unit, a bleed air port in the at least one thrust providing jet engine, a non thrust providing auxiliary supply unit adapted for providing electricity and compressed air on ground and during flight, and at least one compressed air line, wherein the at least one compressed air line is coupled with the bleed air port and the auxiliary supply unit, wherein the environmental control system is coupled with the compressed air line, wherein the auxiliary supply unit is dimensioned so as to exclusively operate the environmental control system by delivering compressed air, and wherein bleed air from the bleed air port is selectively providable to the environmental control system for redundancy.

The aircraft according to an embodiment therefore comprises an environmental control system, which is comparable or completely equal to commonly used bleed air driven environmental control systems. Hence, air-conditioning packs, mixing chambers, air ducts to and from the main components of the environmental control system do not have to be modified. Consequently, there will not arise any costs related with the redesign or a further certification for key components of the environmental control system.

A core aspect of the disclosed subject matter is related to the use of another source of compressed air, which is the auxiliary supply unit. A key design driver for the auxiliary supply unit may preferably be the ability to produce bleed air as a main product, instead of producing thrust and compressed air as a by-product as is the case with common aircraft jet engines having a large bypass ratio.

The auxiliary supply unit preferably is a self-contained unit, which is providable with a fuel and which comprises an engine or any other power conversion device able to produce compressed air and electricity by consuming a fuel and other available elements. The compressed air may be produced by compressing air entering ram air inlets, NACA inlets in the vicinity of the auxiliary supply unit or any other suitable inlet. Depending on the compression ratio, the compressed air may have an elevated temperature, which may be similar or equal to the temperature of pre-cooled bleed air. The delivery of compressed air should be conducted on ground and during the whole flight envelope.

Resultantly, the auxiliary supply unit may be a replacement of an auxiliary power unit (APU) and may additionally be adapted to provide compressed air and electricity to the same interfaces on board the aircraft as the APU. Hence, little or no modifications are necessary for the integration of the auxiliary supply unit.

For redundancy reasons, at least one main engine of the aircraft comprises a bleed air port couplable with a bleed air line that supplies bleed air to various consumers, such as the environmental control system. Hence, while the auxiliary supply unit is intended to deliver compressed air on ground, e.g. for starting the main engines and for powering the environmental control system, bleed air from at least one main engine may still be supplied to a bleed air line for redundancy reasons, if absolutely necessary.

In a preferred embodiment of the invention, the auxiliary supply unit comprises at least one fuel cell and a compressor, which is coupled with an electric motor supplied with electrical energy through the at least one fuel cell. The at least one fuel cell may be a single fuel cell, a fuel cell stack or a plurality of fuel cell stacks, which are electrically coupled. The at least one fuel cell is capable of conducting a fuel cell process under consumption of hydrogen and air for generating electric power and water as well as oxygen depleted air, when air is supplied to the at least one fuel cell as an oxidant. The fuel cell itself may be of any suitable type, which includes a low temperature, a medium temperature or a high temperature fuel cell type that produces electricity and heat. For the use in vehicles, the fuel cell may preferably include proton exchange membrane fuel cells, also known as polymer electrolyte membrane fuel cells (PEMFC). Supported by the use of a fuel cell, the auxiliary supply unit may be a rather compact unit, which is also placeable in a region relatively far away from the environmental control system and/or the main engines. Through using a fuel cell, a particular efficiency for the production of compressed air and electricity is achievable.

For providing an air cooling function, the at least one fuel cell preferably comprises means for transferring thermal energy from inside the at least one fuel cell to a surrounding airflow. This may be accomplished through heat transfer fins, through-flow openings, conduits or an open cathode fuel cell design. The at least one fuel cell may be of an air-cooled type, preferably of an open cathode type. Air that enters the at least one fuel cell from outside the fuel cell passes through air channels or other arrangements integrated into the fuel cell and thereby provides a cooling function. As long as the fuel cell is operated and requires an air flow, air for cooling flows into the fuel cell. Hence, oxygen input and cooling function can be combined.

For delivering electrical energy, the at least one fuel cell is couplable with an electric network on board the vehicle, wherein a power electronics device, preferably an electric inverter, may be arranged between the at least one fuel cell and the electric network for converting the voltage delivered by the at least one fuel cell to a desired level, depending on the respective demand. While the at least one fuel cell may preferably be coupled with a main electric network, it may also be coupled with an emergency network.

Preferably, the at least one fuel cell is selectively couplable with an oxygen storage unit and is adapted for providing electricity independent from air. Hence, in an emergency situation, the use of a ram air turbine as a source of emergency power is not necessary. However, due to the rather expensive storage of pure oxygen, only in emergency situations pure oxygen should be used.

In an advantageous embodiment, the compressed air line is coupled with at least one wing anti-icing device, wherein the auxiliary supply unit is dimensioned so as to additionally provide a sufficient flow of compressed air at an elevated temperature to the at least one wing anti-icing device. Hence, compressed air delivered from the auxiliary supply unit may comprise a temperature sufficient for transferring heat to the wings in order to prevent the accumulation of ice and/or to eliminate accumulated ice.

Still further, the auxiliary supply unit may be coupled with a catalytic converter, which is adapted for receiving a flow of hydrogen and bleed air, and for providing a continuous combustion of hydrogen with bleed air as oxidant and producing a flow of oxygen depleted air. The continuous combustion of hydrogen in the passive catalytic converter, which is not a fuel cell, leads to a (humidified) flow of nitrogen. Resultantly, oxygen depleted air may be fed to different entities, such as a cargo compartment, a fuel tank or the such for inerting purposes or fire knock down.

In case the oxygen depleted air is used for tank inerting, an additional dryer may be present downstream of the catalytic converter. Thereby, the oxygen depleted air is dried in order to reduce or completely eliminate the generation of bacteria in the tank.

In an advantageous embodiment, the auxiliary supply unit is supplied with fuel from a different storage unit as the at least one main engine. This may include the use of another storage tank for a certain fuel, or another storage tank and a different type of fuel, which may be converted to a hydrogen containing gas or any other fuel (gas) directly usable in the fuel cell.

The auxiliary supply unit may comprise a hydrogen supply system having a liquid hydrogen storage device. The required installation space for a liquid hydrogen storage tank is relatively small, but requires a thermal insulation. This, however, may be reduced to a level such that a constant evaporation of hydrogen is accomplished, which in turn allows tapping a certain flow rate of gaseous hydrogen.

In an advantageous embodiment, the auxiliary supply unit, a fuel storage unit and all fuel supply lines for operating the auxiliary supply unit are arranged in a tail cone outside a pressurized section of the aircraft. Hence, no fuel supply line or storage device for the auxiliary supply unit provides any issues regarding safety or reliability.

The disclosed subject matter further relates to the use of an auxiliary supply system separate from thrust providing jet engines for providing compressed air to an air conditioning system comprising at least one pneumatic air cycle air conditioning unit.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages, and application options are disclosed in the following description of the exemplary embodiments in the figures. Furthermore, identical or similar components in the figures have the same reference characters.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
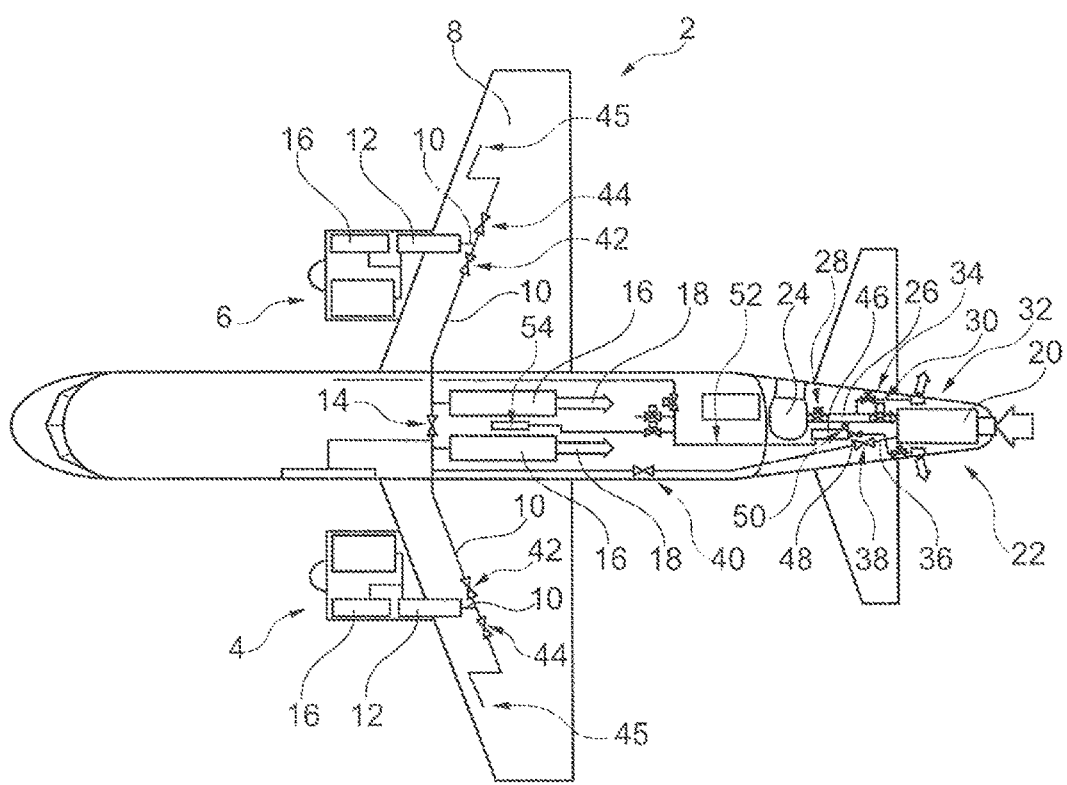
FIG. 1 shows the setup of an aircraft in a general overview.

FIG. 1 shows an aircraft 2 having two main engines 4 and 6, which provide thrust and bleed air and preferably are jet engines having a relatively large bypass ratio. The main engines 4 and 6 are exemplarily attached to an underside of a main wing 8, one engine per wing half. Bleed air is deliverable from a bleed air port of each of the engines 4 and 6 to a compressed (bleed) air line 10 and passes a precooler 12, which lowers the temperature level of the bleed air. The compressed air lines 10 from both engines 4 and 6 are connected through a cross bleed valve 14 with each other, which may selectively deliver bleed air from one engine 4 to the other engine 6 and vice versa. This allows, for example, to operate a pneumatic starter 16 arranged in one engine 4 and 6 operated by bleed air from the other engine 4, 6.

Besides that, bleed air is deliverable to an environmental control system 16, which processes the bleed air and mixes it with used, recirculated air, in order to produce fresh cabin air 18. For this purpose, the compressed air lines 10 are couplable with the environmental control system 16.

According to an embodiment of the invention, an auxiliary supply unit 20 is located in a tail region 22 of the aircraft 2 and is exemplarily based on a fuel cell, an electric motor and an electric generator to produce bleed air and electrical energy. The basic concept of the auxiliary supply unit 20 is explained in more detail with reference to FIG. 2.

The auxiliary supply unit 20 is coupled with a tank for storing liquid hydrogen 24, by means of a hydrogen line 26, comprising a hydrogen pressure regulator 28, a valve 30 for adjusting the flow of hydrogen and a boil off port 32, which allows to limit the pressure in tank 24 and hydrogen line 26 based on an overpressure valve 34, through which hydrogen may exit the hydrogen line 26 into the surrounding of the aircraft. Arranging the auxiliary supply unit 20 in the tail region 22 is particularly useful, as disposed of hydrogen is clearly downstream of the engines 4 and 6.

The auxiliary supply unit 20 delivers a flow of compressed air to a further, auxiliary compressed air line 36, which is coupled with compressed air lines 10 and comprises a bleed valve 38 as well as a check valve 40 for preventing the flow of bleed air from one of the engines 4 and 6 into the auxiliary supply unit 20.

Resultingly, the aircraft 2 comprises altogether three sources of compressed air, for e.g. operating a commonly designed environmental control system 16 based on an air cycle air-conditioning pack. As the design of modern aircraft engines leads to an ever increasing bypass ratio, the capability of delivering bleed air is more and more limited. A core aspect of the aircraft 2 according to an embodiment of the invention lies in the capability of an auxiliary supply unit 20 to deliver a sufficient flow of compressed air in all operating phases of the aircraft 2, such that the environmental control system 16 may be operated solely through the use of compressed air from the auxiliary supply unit 20. However, as both main engines 4 and 6 are couplable with the environmental control system 16, by opening respective bleed air valves 42, they may still be able to operate the environmental control system 16, in case the auxiliary supply unit 20 may not be operated, for redundancy.

Besides the delivery of compressed air as energy source, the main engines 4 and 6 may provide compressed (bleed) air for wing anti-icing through anti-icing valves 44 to wing anti icing devices 45, which may simply be air outlets. However, this may also be possible through compressed air delivered by the auxiliary supply unit 20 by opening the bleed air valves 42 and wing anti-icing valves 44, but interrupting a bleed air connection from the main engines 4 and 6 to the bleed lines 10.

Another advantageous function achieved in the aircraft 2 is providing oxygen depleted air through a catalytic generator 46, which is supplied with compressed air delivered by the auxiliary supply unit 20 through a valve 48 and hydrogen through a valve 50, such that it provides humidified and inert gas. This is delivered into an oxygen depleted air line 52 and is useful for cargo inerting, tank inerting, fire knock down, etc. For tank inerting, it should be dried additionally, before it enters a fuel tank inerting system 54.

Figure 2:
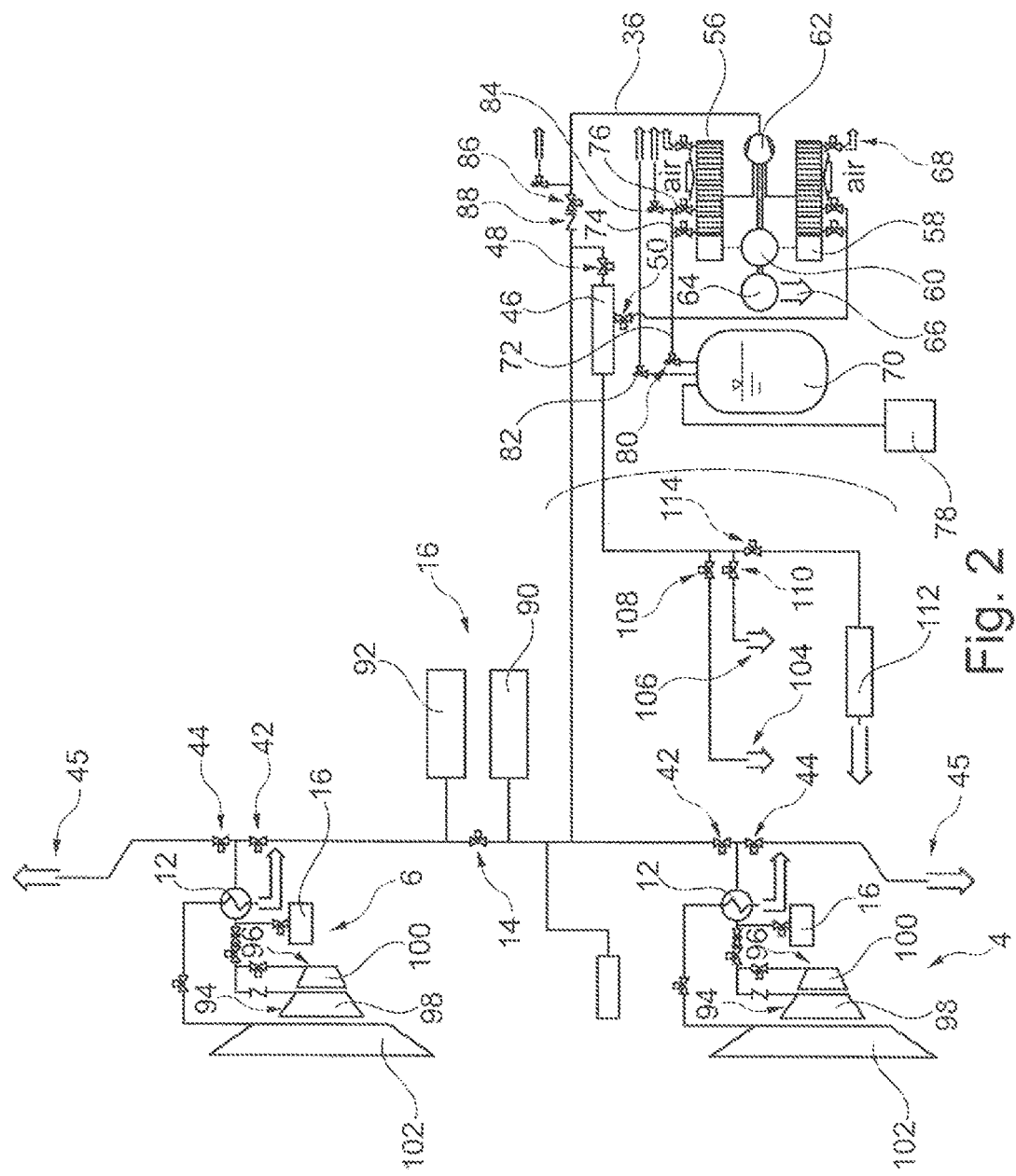
FIG. 2 shows a system view of an aircraft according to an embodiment of the invention.

FIG. 2 shows a more system-oriented view of the components integrated into the aircraft 2 of FIG. 1. Here, particularly the auxiliary supply unit 20 is shown in more detail.

An air breathing fuel cell 56 comprises an annular shape, to which one or a plurality of inverters 58 are preferably directly mechanically and electrically attached. The fuel cell 56 delivers the generated voltage directly to the inverters 58, which in turn process the voltage, e.g. supported through an external control unit (not shown), for driving an electric motor 60 coupled with the inverters 58. The motor 60 is mechanically coupled with a compressor 62, which sucks air from the surrounding of the fuel cell 56, e.g. through an air inlet (not shown), wherein the sucked in air flows through the air breathing fuel cell 56 and delivers it to the compressed air line 36. The efficiency of such an auxiliary supply unit 20 clearly exceeds the efficiency of jet engines, which are tapped to provide bleed air.

In order to be able to use all existing interfaces for an auxiliary power unit, the auxiliary supply unit 20 also comprises a generator 64 coupled with the motor 60 and electrically connected to an electrical network 66 of the aircraft.

A purge valve 68 may be present for purging the fuel cell 56. Hydrogen is exemplarily delivered by a hydrogen tank 70, which is coupled with a hydrogen line 72, which in turn is coupled with hydrogen supply valves 74 and 76. The tank 70 may be adapted for storing liquid hydrogen and may also comprise a filling valve 78. Appropriate pressure relief valves 80, 82 ad 84 are considered in order to protect any duct or component from bursting due to overpressure. The close combination of the auxiliary supply unit 20 and the hydrogen tank 70 allows to build up a self-contained unit.

Such an arrangement of fuel cell, compressor, motor and optionally generator is derivable from German patent application DE 10 2014 119 279.6 or any other subsequent application related thereto.

Compressed air generated in the compressor 62 flows through the compressed air line 36 through a shutoff valve 86, which allows to isolate the compressor 62 from the bleed air system directly downstream the compressor 62. Afterwards, the compressed air flows through a common APU check valve 88 and directly reaches the compressed air lines 10 downstream the engines 4 and 6, where it may reach the environmental control system 16. The latter may comprise a first air conditioning pack 90 and a second air conditioning pack 92, which are placed on both sides of the crossbleed valve 14. Consequently, the crossbleed valve 14 should be opened such that both packs 90, 92 are supplied with compressed air.

For preventing the supply of the engines 4 and 6 with compressed air from the auxiliary supply unit 20, they are isolatable through the (shutoff) valves 42. Further downstream and reachable through the valves 44, wing anti icing devices 45 are preferably located in leading edge present.

As mentioned before, the engines 4 and 6 also comprise bleed air ports 94 and 96 in different compressor sections 98 and 100, wherein both bleed air ports 94 and 96 are coupled with a pre-cooler 12, which in turn may be flown through by air conveyed through a fan section 102 of the respective engine 4, 6.

During normal operation of the aircraft 2, the valves 42 should be closed, while valves 86 and 88 should be opened.

The environmental control system 16 is then supplied with compressed air from the auxiliary supply unit 20 only. A fraction of compressed air is also delivered to the catalytic generator 46 through the valve 48 to produce oxygen depleted air.

Further, oxygen depleted air is distributed to fire knock down and suppression means 104 and 106 through distribution valves 108 and 110. Further, a dryer 112 is couplable with catalytic generator 46 through a distribution valve 114. The dryer 112 dries the oxygen depleted air, making it capable to inert a tank (not shown).

The auxiliary supply unit 20 is preferably able to provide a sufficient flow of compressed air for the environmental control system 16 as well as other consumers of compressed air, thereby providing a relief for the engines 4, 6. For the sake of a sufficient redundancy, the engines 4 and 6 may, however, still be able to take over the supply of compressed air.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft having at least one thrust providing jet engine and a fuselage with an integrated pressurized cabin, the aircraft comprising:
   an environmental control system comprising at least one pneumatic air cycle air conditioning unit;
   a bleed air port in the at least one thrust providing jet engine;
   a non thrust providing auxiliary supply unit adapted for providing electricity and compressed air on ground and during flight; and
   at least one compressed air line;
   wherein the at least one compressed air line is coupled with the bleed air port and the auxiliary supply unit;
   wherein the environmental control system is coupled with the at least one compressed air line;
   wherein the auxiliary supply unit is dimensioned to exclusively operate the environmental control system by delivering compressed air;
   wherein bleed air from the bleed air port is selectively providable to the environmental control system for redundancy; and
   wherein the auxiliary supply unit comprises at least one fuel cell, a compressor and an electric motor coupled with the compressor and the at least one fuel cell.

2. The aircraft according to claim 1, wherein the at least one fuel cell is coupled with an oxygen storage unit and is adapted for providing electricity independent from air.

3. The aircraft according to claim 1, wherein the at least one compressed air line is coupled with at least one wing anti-icing device, wherein the auxiliary supply unit is dimensioned to additionally provide a sufficient flow of compressed air at an elevated temperature to the at least one wing anti-icing device.

4. An aircraft having at least one thrust providing jet engine and a fuselage with an integrated pressurized cabin, the aircraft comprising:
   an environmental control system comprising at least one pneumatic air cycle air conditioning unit;
   a bleed air port in the at least one thrust providing jet engine;
   a non thrust providing auxiliary supply unit adapted for providing electricity and compressed air on ground and during flight; and
   at least one compressed air line;
   wherein the at least one compressed air line is coupled with the bleed air port and the auxiliary supply unit;
   wherein the environmental control system is coupled with the at least one compressed air line;
   wherein the auxiliary supply unit is dimensioned to exclusively operate the environmental control system by delivering compressed air;
   wherein bleed air from the bleed air port is selectively providable to the environmental control system for redundancy; and
   wherein the auxiliary supply unit is coupled with a catalytic converter configured to receive a flow of hydrogen and compressed air, and to provide a continuous combustion of hydrogen with compressed air as oxidant and producing a flow of oxygen depleted air.

5. The aircraft according to claim 4, further comprising an additional dryer downstream of the catalytic converter for drying the flow of oxygen depleted air.

6. The aircraft according to claim 1, wherein the auxiliary supply unit is supplied with fuel from a different storage unit as the at least one thrust providing jet engine.

7. The aircraft according to claim 1, wherein the auxiliary supply unit comprises a hydrogen supply system having a liquid hydrogen storage device.

8. The aircraft according to claim 1, wherein the auxiliary supply unit, a fuel storage unit and all fuel supply lines for operating the auxiliary supply unit are arranged in a tail cone outside a pressurized section of the aircraft.

* * * * *